(12) United States Patent
Hennige et al.

(10) Patent No.: US 7,575,832 B2
(45) Date of Patent: Aug. 18, 2009

(54) ION CONDUCTING BATTERY SEPARATOR FOR LITHIUM BATTERIES, METHOD FOR THE PRODUCTION AND USE THEREOF

(75) Inventors: Volker Hennige, Duelmen (DE); Christian Hying, Rhede (DE); Gerhard Hoerpel, Nottuln (DE)

(73) Assignee: Degussa AG, Duesseldorf (DE)

( * ) Notice: Subject to any disclaimer, the term of this patent is extended or adjusted under 35 U.S.C. 154(b) by 672 days.

(21) Appl. No.: 10/519,097

(22) PCT Filed: Jul. 21, 2003

(86) PCT No.: PCT/EP03/07933

§ 371 (c)(1),
(2), (4) Date: Dec. 27, 2004

(87) PCT Pub. No.: WO2004/021477

PCT Pub. Date: Mar. 11, 2004

(65) Prior Publication Data

US 2006/0166085 A1 Jul. 27, 2006

(30) Foreign Application Priority Data

Aug. 27, 2002 (DE) ................. 102 40 032

(51) Int. Cl.
*H01M 2/16* (2006.01)
*H01M 4/00* (2006.01)
(52) U.S. Cl. .............. 429/252; 429/251; 429/249; 429/247; 429/128
(58) Field of Classification Search ........... 429/251, 429/252
See application file for complete search history.

(56) References Cited

U.S. PATENT DOCUMENTS

| | | | |
|---|---|---|---|
| 5,254,416 A * | 10/1993 | Kubota | 429/213 |
| 5,411,820 A * | 5/1995 | Chaloner-Gill | 429/307 |
| 5,449,576 A | 9/1995 | Anani | |
| 5,795,679 A * | 8/1998 | Kawakami et al. | 429/218.1 |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,620,320 B1 * | 9/2003 | Hying et al. | 210/500.25 |
| 6,828,065 B2 * | 12/2004 | Munshi | 429/309 |
| 6,841,075 B2 | 1/2005 | Penth et al. | |
| 2002/0023419 A1 | 2/2002 | Penth et al. | |
| 2002/0039648 A1 | 4/2002 | Horpel et al. | |
| 2004/0028913 A1 | 2/2004 | Hennige et al. | |
| 2004/0038105 A1 | 2/2004 | Hennige et al. | |
| 2004/0262169 A1 | 12/2004 | Hying et al. | |
| 2005/0031942 A1 | 2/2005 | Hennige et al. | |
| 2006/0166085 A1 | 7/2006 | Hennige et al. | |

FOREIGN PATENT DOCUMENTS

| | | |
|---|---|---|
| EP | 0 981 176 | 2/2000 |
| EP | 1 049 188 | 11/2000 |
| WO | WO 9962620 A1 * | 12/1999 |

OTHER PUBLICATIONS

U.S. Appl. No. 11/578,664, filed Oct. 18, 2006, Hoerpel, et al.
U.S. Appl. No. 11/577,542, filed Apr. 19, 2007, Hoerpel, et al.
U.S. Appl. No. 12/063,626, filed Feb. 12, 2008, Hying, et al.
U.S. Appl. No. 11/917,914, filed Dec. 18, 2007, Holzapfel, et al.
U.S. Appl. No. 12/021,436, filed Jan. 29, 2008, Pascaly, et al.
U.S. Appl. No. 12/066,146, filed Mar. 7, 2008, Schormann, et al.
U.S. Appl. No. 10/519,097, filed Dec. 27, 2004, Hennige, et al.
U.S. Appl. No. 10/575,734, filed Apr. 13, 2006, Hoerpel, et al.
U.S. Appl. No. 11/575,759, filed Apr. 13, 2006, Hennige, et al.
U.S. Appl. No. 10/575,268, filed Apr. 11, 2006, Hennige, et al.
U.S. Appl. No. 10/575,274, filed Apr. 11, 2006, Hennige, et al.

* cited by examiner

*Primary Examiner*—Patrick Ryan
*Assistant Examiner*—Zachary Best
(74) *Attorney, Agent, or Firm*—Oblon, Spivak, McClelland, Maier & Neustadt, P.C.

(57) ABSTRACT

Separators for lithium batteries based on a sheetlike flexible substrate provided with a plurality of openings and having a porous inorganic electrically insulating coating on and in the substrate, the coating closing the openings in the substrate, the material of the substrate being selected from woven or non-woven electrically nonconductive polymeric fibers and the inorganic electrically conductive coating comprising metal oxide particles, the separators being electrical insulators and having lithium ion conducting properties without the presence of an electrolyte, the separators comprising at least one lithium ion conducting inorganic material which may also contain organic groups chemically bonded to the inorganic coating, which separators, after filling them with an additional lithium ion conducting electrolyte, have much higher ion conduction than conventional combinations of non-lithium ion conducting separators and electrolyte; a process for producing the separators; and batteries, such as high power lithium batteries, containing them.

25 Claims, No Drawings

ION CONDUCTING BATTERY SEPARATOR FOR LITHIUM BATTERIES, METHOD FOR THE PRODUCTION AND USE THEREOF

An electrical separator is a separator used in batteries and other arrangements in which electrodes have to be separated from one another while maintaining of ion conductivity, for example.

The separator is normally a thin porous insulating material possessing high ion permeability, good mechanical strength and long-term stability to the chemicals and solvents used in the system, for example in the electrolyte of the battery. In batteries the separator should fully electronically insulate the cathode from the anode while being permeable for the electrolyte. It must also be permanently elastic and follow the movements in the system, for example in the electrode pack during charging and discharging.

The separator is a critical determinant of the lifetime of the arrangement in which it is used—of battery cell life, for example. The development of rechargeable batteries is therefore influenced by the development of suitable separator materials.

General information about electrical separators and batteries may be gleaned for example from J. O. Besenhard in "Handbook of Battery Materials" (VCH-Verlag, Weinheim 1999).

Separators in use at present consist predominantly of porous organic polymer films or of inorganic nonwoven materials, such as nonwovens of glass or ceramic materials or else ceramic papers. These are produced by various companies. Important producers include Celgard, Tonen, Ube, Asahi, Binzer, Mitsubishi, Daramic, and others. A typical organic separator consists for example of polypropylene or of a polypropylene/-polyethylene/polypropylene composite.

Disadvantages of these organic polyolefin separators are their relatively low thermal stability limit of well below 150° C. and also their low chemical stability in inorganic lithium battery cells. In the Li batteries, where the separator is in contact with the lithium or with the lithiated graphite, the polyolefins used are slowly attacked. In systems with a polymer electrolyte, therefore, an impervious film of oxidation product is formed which prevents further destruction of the separator in Li ion batteries.

There have been initial attempts to use inorganic composite materials as separators. DE 198 38 800 for instance encompasses an electrical separator comprising a sheetlike flexible substrate having a multiplicity of openings and having a coating on said substrate, the separator being characterized in that the material of said substrate is selected from metals, alloys, plastics, glass, and carbon fiber or a combination thereof and said coating is a two-dimensionally continuous porous electrically nonconducting ceramic coating. The separators, which (as indicated in the example) are supported by electrically conducting material, however, have been determined to be unsuitable for lithium ion cells, since the coating cannot be produced over a large area at the thickness described without flaws, with the consequence that shortcircuiting can occur very easily.

In EP 1 049 188 an attempt is therefore made to produce a separator composed of a film of polymer with lithium ion conducting glass ceramic powder contained therein. This separator is subsequently impregnated with an electrolyte. The film described has a thickness of less than 100 µm. The conductivities achieved, although better than those with separators containing no lithium ion conducting glass ceramic powder, are still between $1\times10^{-4}$ and $1\times10^{-3}$ S/cm and thus still within a range which is too low for technical applications in high power batteries.

DE 199 18 856 describes a separator which can be based on a polymer fiber substrate to which there is applied a dispersion of ceramic particles in a solution of a nitrogen-containing aromatic polymer in a polar organic solvent. The polymer here acts as a binder or film former, while the ceramic particles are intended to ensure a certain porosity. Separators produced in this way exhibit a low porosity, since some of the pores of the ceramic particles are closed by the binder.

JP 11166114 describes a polymeric ion conducting film suitable as a separator for lithium batteries. This separator includes functionalized siloxanes and also polyalkyl ethers and polyalkylene glycols as organic polymers. A conductive salt, such as $LiPF_6$ or $LiClO_4$, is then dissolved in these organic/inorganic films. This separator, however, contains no inorganic particles. Since the ionic groups, i.e., the anions, are not attached to a matrix of, for example, inorganic particles, the transference number for the lithium, and hence the conductivity overall, is comparatively small.

In summary it can be stated that at the present time there is no suitable substantially inorganic separator material which can be used to produce inexpensively high power or high energy batteries, including in particular wound inorganic batteries which are hence very reliable in operation.

We were able to show in previous work (DE 101 42 622) that inorganic separators of this kind are realizable to some extent with a material comprising a sheetlike flexible substrate having a multiplicity of openings and having a coating on and in said substrate, the material of said substrate being selected from woven or non-woven electrically nonconductive fibers of glass or ceramic or a combination thereof and said coating being a porous electrically insulating ceramic coating, the resulting separator having a thickness of less than 100 µm and being bendable, having a sufficiently low resistance in conjunction with the electrolyte and yet possessing sufficiently good long-term stability. For a multiplicity of applications, however, the resistance of these separators is still too high, since the carrier used is a woven glass fabric which is firstly too thick and secondly has too low a porosity.

In the course of ongoing optimization of the properties of the separators described in DE 101 42 622 it was found that separators having the stated properties are realizable if polymeric substrate materials are used. Obtained in this way are electrical separators which comprise a sheetlike flexible substrate having a multiplicity of openings and having a coating on and in said substrate, the material of said substrate being selected from non-woven electrically nonconductive fibers of polymers and said coating being a porous electrically insulating ceramic coating. The separator has a thickness of less than 80 µm, is bendable, and in conjunction with an electrolyte has a sufficiently low resistance while possessing, moreover, sufficiently good long-term stability.

Despite the fact that the separators described in the as yet unpublished application DE 102 08 277 are highly suitable for the tasks described it became very clear to us that a further increase in current density and a reduction in the resistance are very difficult indeed to achieve through optimization of parameters such as separator thickness and porosity on account of the fact that the limits of mechanical performance are being or already have been reached.

A feature of high power batteries is that large quantities of energy are available within a very short time. At the high current densities there should be no interruption in the voltage. This is generally achieved by optimizing the negative and positive active materials (graphite electrode and lithium cobalt oxide electrode). Moreover, the electrolyte-saturated separator ought to possess an extremely low resistance. This is achieved by choosing a very open separator having very straight pores which are as large as possible. The separator ought additionally to be extremely thin. As already described, it is in varying these parameters that technological limits are now being reached which are impossible to overcome.

It is accordingly an object of the present invention to provide a separator which is particularly suitable for use in high power lithium batteries and allows a further increase in the power and/or performance of these battery systems.

Surprisingly it has now been found that a further marked increase in the performance of a separator or battery system can be achieved by providing the pores of the separator with negative fixed charges. For this purpose it is possible to use any of a wide variety of chemicals with negative charges and lithium as counterion which can be attached to the ceramic surface via Zr—O or Si—O groups. Examples that may be mentioned here include the zirconium phosphates or zirconium sulfoarylphosphonates and the sulfoalkylsilanes. The production of an ion conducting composite material was described back in WO 99/62620; however, it did not describe how such a composite material can be adapted in a few steps to form an outstanding separator for high power lithium batteries.

The present invention accordingly provides a separator for high power lithium batteries, based on a sheetlike flexible substrate having a multiplicity of openings and having a porous inorganic electrically insulating coating on and in said substrate, said coating closing the openings in the substrate, the material of said substrate being selected from non-woven electrically nonconductive polymeric fibers and said inorganic electrically insulating coating comprising particles, wherein the separator is an electrical insulator and has lithium ion conducting properties without the presence of an electrolyte.

Likewise provided by the present invention is a process for producing a separator according to the present invention having lithium ion conducting properties, comprising a sheetlike flexible substrate having a multiplicity of openings and having a porous inorganic electrically insulating coating on and in said substrate, the material of said substrate being selected from non-woven electrically nonconductive polymeric fibers, which comprises producing the separator using a compound having lithium ion conducting properties.

The present invention further provides for the use of an inventive separator in lithium batteries, especially high power lithium batteries, and also provides lithium batteries comprising an inventive separator.

The inventive separator has the advantage that even without an electrolyte it has lithium ion conducting properties. In this way the lithium ion conductivity of the electrolyte-filled separator is significantly increased as compared with conventional separators. The introduction of negative fixed charges increases the transference number for the lithium ion, which ideally should be the only one to migrate. If not only the pore walls are equipped with negative fixed charges but also the material making up the pore structure is composed of Li ion conducting inorganic materials, this leads to a further small increase in the conductivity of the electrolyte-filled separator.

The inventive separator, moreover, exhibits a substantially higher conductivity than inorganic nonporous lithium ion conducting separators based on solid ion conductors. With such separators there is the disadvantage that attachment to the active masses is very difficult to achieve. This is because it is necessary to ensure that the ions can reach the porous matrix of the active materials only through an electrolyte. As a consequence it is not possible to do without electrolyte entirely. With the inventive separator this problem is gotten around by the additional presence of lithium ion conducting electrolyte. The absolute amount of electrolyte, however, can be lower than in the conventional battery system. As a result of the elecrolyte-filled pores there is a very large surface area available with a consequent reduction in the volume resistances like those which appear at all sharply defined material boundaries in cells comprising laminated polymer electrolyte separators.

The inventive separator, moreover, has the advantage that its use in lithium batteries leads to very good battery reliability.

Polymer separators provide the security required at present for lithium batteries for example by preventing any ion transport through the electrolyte above a certain temperature (the shutdown temperature, which is around 120° C.). At this temperature, then, the pore microstructure of the separator collapses and all the pores become closed. Since ions can no longer be transported the dangerous discharge and hence the reaction which can lead to explosion come to a standstill. If, however, the cell is heated further due to external circumstances, then at about 150 to 180° C. the breakdown temperature is exceeded. Above this temperature the separator melts and contracts. At numerous points in the battery cell there is then direct contact between the two electrodes and hence extensive internal shortcircuiting. This leads to an uncontrolled reaction which ends with the cell exploding or in which the pressure which develops is released through an overpressure valve (a bursting disk), frequently with signs of fire.

The inventive hybrid (i.e., containing inorganic components and polymeric carrier material) separator undergoes shutdown when, owing to the high temperature, the polymeric structure of the carrier material melts and penetrates into the pores of the inorganic material, thereby closing them. This is the case with polyethylene (PE) at about 125° C., with polypropylene (PP) at 150-165° C., and with polyethylene terephthalate (PET) at above 230° C. Meltdown (with PP separators at about 150 to max. 165° C.), however, does not occur with the inventive separator. The inventive separator, by virtue of the shutdown mechanism in the battery cells, therefore meets the requirements made by various battery manufacturers for a safety switchoff mechanism. The inorganic particles ensure that there can never be a meltdown. It is therefore ensured that there are no operating states in which extensive shortcircuiting can come about. If an additional shutdown mechanism is absolutely necessary for practical use it can be achieved by equipping the surface and/or the pores of the ceramic or hybrid separator of the invention with a material which, on reaching the temperature limit, closes the pores and prevents continued ion flux. This can be accomplished for example by means of a polymer or wax whose melting point is in that range.

The separator of the invention is also very safe in the event of an internal short circuit due for example to an accident. If, for example, a nail were to puncture a battery, the following would happen, depending on the type of separator: the polymeric separator would melt at the puncture site (a short-circuit current flowing through the nail and causing it to heat up) and would contract. As a result the short-circuit location would grow larger and larger and the reaction could get out of control. With the hybrid separator of the invention only the polymeric substrate material would melt, at most, but not the inorganic separator material. The reaction inside the battery cell after such an accident would therefore proceed very much more moderately. This battery is much safer, accordingly, than one with a polymeric separator. This is an important factor in mobile applications in particular.

The separator of the invention is described by way of example below, without being restricted to this exemplary description.

The separator of the invention for high power lithium batteries, based on a sheetlike flexible substrate provided with a multiplicity of openings and having a porous inorganic electrically insulating coating on and in said substrate, said coating closing the openings in said substrate and the material of the substrate being selected from non-woven electrically non-conductive fibers and the inorganic electrically insulating coating comprising particles, is distinguished by the fact that the separator is an electrical insulator and has lithium ion conducting properties without the presence of an electrolyte.

The separators of the invention are preferably lithium ion conducting at a temperature of from −40° C. to 150° C. The lithium ion conducting properties of the separator are preferably obtained by virtue of the separator comprising at least one organic and/or inorganic material which has lithium ion conducting properties and is chemically bonded to the inorganic coating. It can be very preferable for at least one inorganic material, which may also contain organic groups and which has lithium ion conducting properties, to be present as an admixture to the structure of the separator, i.e., within the porous coating. In one particularly preferred embodiment of the separator of the invention at least part of the material forming the inorganic porous coating has lithium ion conducting properties.

The material of the substrate may be selected from loop-formed knits, felts or nonwovens of polymer fibers. The separator of the invention preferably comprises a flexible nonwoven having a porous inorganic coating present on and in said nonwoven. The nonwoven preferably has a thickness of less than 30 μm.

With particular preference the separator of the invention comprises a substrate, preferably a nonwoven, which has a thickness of less than 20 μm, preferably a thickness of from 10 to 20 μm. A particularly important requirement for use in a separator of the invention is an extremely homogeneous pore radius distribution in the nonwoven. A homogeneous pore radius distribution in the nonwoven in conjunction with optimally adapted particles of a specific size leads to an optimized porosity of the separator of the invention. Very preferably, therefore, a separator of the invention comprises a nonwoven with a pore radius distribution in which at least 50% of the pores have a radius of from 50 to 150 μm.

The porosity of the nonwoven is preferably more than 50%, more preferably from 50 to 97%, very preferably from 60 to 90%, and more preferably still from 70 to 90%. Porosity in this context is defined as the volume of the nonwoven (100%) minus the volume of fibers of the nonwoven, i.e., the volume fraction of the nonwoven that is not taken up by material. The volume of the nonwoven can be calculated from its dimensions. The volume of the fibers is calculated from the measured weight of the nonwoven in question and from the density of the polymeric fibers. The large porosity of the substrate also allows a higher porosity for the hybrid separator of the invention, which is why a higher uptake of electrolyte can be achieved with the separator of the invention.

For a separator having insulating properties to be obtainable the polymeric fibers for its nonwoven comprise electrically nonconductive fibers of polymers which are preferably selected from polyacrylonitrile (PAN), polyester, for example polyethylene terephthalate, and/or polyolefin (PO), for example polypropylene (PP) or polyethylene (PE) or mixtures of such polyolefins. The polymeric fibers of the nonwovens are preferably from 0.1 to 10 μm and more preferably from 1 to 5 μm in diameter. Very preferred substrates/nonwovens have a basis weight of less than 20 g/m², preferably less than 10 g/m².

The separators of the invention are preferably less than 35 μm, more preferably less than 25 μm, and very preferably from 15 to 25 μm in thickness. The thickness of the substrate has a substantial influence on the properties of the separator, since not only the flexibility but also the sheet resistance of the electrolyte-saturated separator is dependent on the thickness of the substrate. The low thickness provides a particularly low electrical resistance of the separator in use with an electrolyte. The separator itself, of course, has a very high electrical resistance, since it is required to have insulating properties itself. In addition, thinner separators permit an increased packing density in a battery stack, so that a large amount of energy can be stored in the same volume.

The separator of the invention, on and in the nonwoven, has a porous electrically insulating ceramic coating. Preferably, the porous inorganic coating on and in the nonwoven comprises oxide particles of the elements Al, Si and/or Zr. More preferably the separator comprises a porous inorganic coating which itself comprises lithium ion conducting materials, said coating being present on and in the nonwoven. Lithium ion conducting materials of this kind may be for example lithium phosphate zirconate glasses, lithium ion conducting glass ceramics as described in EP 1 049 188, α- and/or γ-lithium zirconium phosphates or lithium sulfonate doped zirconium phosphonates, or a mixture of these compounds. The metal oxide particles and/or the lithium ion conducting particles are preferably bonded adhesively with an oxide of the elements Zr and/or Si.

The separator of the invention preferably has a porosity of from 30% to 80%. The porosity refers to the accessible, i.e., open, pores. The porosity in this sense can be determined by the familiar method of mercury porosimetry or can be calculated from the volume and the density of the ingredients used, on the assumption that open pores only are present.

A feature of the separators of the invention is that they may have a breaking strength of at least 1 N/cm, preferably at least 3 N/cm, and very preferably from 3 to 10 N/cm. The separators of the invention are preferably flexible and are bendable around a radius down to 100 m, preferably down to 0.5 m, and very preferably down to 0.5 mm, without damage. The high breaking strength and the good bendability of the separator of the invention have the advantage that the separator is able to follow electrode geometry changes occurring in the course of the charging and discharging of a battery without the separator becoming damaged. Bendability, moreover, has the advantage that this separator can be used to produce commercially standardized wound cells. With these cells the electrode-separator plies are wound up spirally with each other in standardized size and contacted.

It can be advantageous for the inner and/or outer surfaces of the particles present in the separator to be coated with a layer of a lithium ion conducting inorganic material which may also contain organic groups. Such a layer preferably has a thickness of from 1 nm to 1 μm, more preferably from 10 nm to 100 nm. Depending on the particular embodiment of the separator of the invention the lithium ion conducting material in the layer may be the only material having lithium ion conducting properties or else may be present in addition to such material which is used to form the inorganic porous coating.

The separator, particularly in the layer coating the particles, preferably comprises a lithium ion conducting material which has negative charges in the matrix material and lithium cations. More preferably this lithium ion conducting material contains ionic groups selected from the group consisting of sulfonates, phosphonates, carbonates, and sulfonylamides or mixtures of these groups. These ionic groups can be organic compounds bonded chemically to the inorganic particles via organic groups or spacers. These organic groups or spacers are, very preferably, fluorinated or nonfluorinated aryl and/or alkyl chains and/or polyether chains and the ionic groups are thereby connected to the inner and/or outer surface of the particles present in the separator. The ionic groups are generally attached, either directly or else indirectly via the organic groups or spacers, via Si—O— or Zr—O— groups, to the inorganic particles.

In one preferred embodiment the lithium conducting material of the separator comprises compounds of the general formula

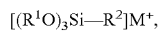

where $R^1$ is a methyl or ethyl group, M is either H or Li, and $R^2$ is a bis(perfluoromethylsulfonyl)amide group of the formula

—$CF_2$—$SO_2$—N—$SO_2$—$CF_3$.

In a likewise preferred embodiment the lithium conducting material of the separator comprises organosilicon compounds of the general formula

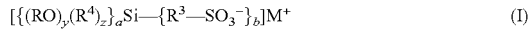 (I)

or

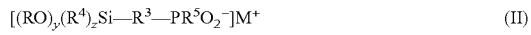 (II)

where $R^3$ is a linear or branched alkylene group having 1 to 12 carbon atoms, a cycloalkyl group having 5 to 8 carbon atoms or a unit of the general formula

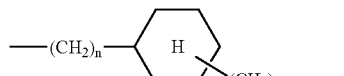 (IV)

 (V)

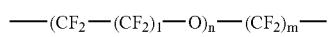 (VI)

where l, n, and m respectively are each a number from 0 to 12, where M is an $H^+$ or a lithium ion, and where y is a number between 1 and 3, z is a number between 0 and 2, y+z=3, a is a number between 1 and 3, b=4−a, R and $R^4$ are identical or different and are methyl, ethyl, propyl, butyl or H, and $R^5$ is H, OH, OM or $R^3$.

In another embodiment the lithium ion conducting materials present in the separator of the invention may also comprise lithium phosphate zirconate glasses, α- and/or γ-lithium zirconium phosphates or lithium sulfonates or lithium phosphonates that are attached to α- and/or γ-zirconium phosphonates, or a mixture of these compounds. These compounds too may derive from the corresponding acids by replacement of the $H^+$ with $Li^+$. A number of examples are indicated below:

$Zr(HPO_4)_2 \rightarrow Li_2(Zr(PO_4)_2$
$Zr(O_3P—C_6H_4—SO_3H)_2 \rightarrow Li_2Zr(O_3P—C_6H_4—SO_3)_2$
$Zr(O_3P—CH_2—PO_3H_2)_2 \rightarrow Li_4Zr(O_3P—CH_2—PO_3)_2$
$Zr(O_3P—CF_2—PO_3H_2)_2 \rightarrow Li_4Zr(O_3P—CF_2—PO_3)_2$ In a generalized form, the separator of the invention preferably comprises lithium salts having the following formula:

$Li_2Zr(O_3P—R—SO_3)_2$ $Li_4Zr(O_3P—R—PO_3)_2$ as lithium ion conducting materials, where R is a perfluorinated, partly fluorinated or nonfluorinated aryl or alkyl chain having 1-12 carbon atoms.

All of these lithium salts whose anion is attached to the inorganic matrix, therefore, can be derived from the corresponding acids. In the separators they may also be present initially in the form of the acids. Before being used in the batteries, however, it is necessary in this case for the $H^+$ form to be converted into the $Li^+$ form.

It has proven particularly advantageous for the separator of the invention to comprise a lithium ion conducting material in the porous inorganic coating and for the particles of the coating additionally to have a layer which likewise comprises a lithium ion conducting material.

Separators equipped in this way exhibit particularly high lithium ion conductivities in conjunction with an appropriate electrolyte.

It can be advantageous for the separator to possess a noninherent shutdown mechanism. This mechanism can be achieved, for example, by having, on or in the separator, a very thin layer of waxy or polymeric particles which melt at a desired shutdown temperature, so-called shutdown particles. Particularly preferred materials for the shutdown particles include for example natural or artificial waxes or low-melting polymers, such as polyolefins, the material for the shutdown particles being selected so that the particles melt at the desired shutdown temperature and close the pores of the separator, thereby preventing further ion flux.

The shutdown particles preferably have an average particle size ($D_w$) which is not less than the average pore size ($d_s$) in the porous inorganic layer of the separator. This is advantageous in particular because it prevents pores of the separator layer being penetrated and closed, which would result in a reduction in the pore volume and hence in the conductivity of the separator and also the performance of the battery. The thickness of the shutdown particle layer is only critical insofar as an excessively thick layer would unnecessarily increase the resistance in the battery system. To ensure safe shutdown, the shutdown particle layer should have a thickness ($z_w$) ranging from approximately equal to the average size of the shutdown particles ($D_w$) up to 10 $D_w$, and preferably from 2 $D_w$ to $D_w$. A separator thus equipped possesses a primary safety feature. However, unlike the purely organic separator materials, this separator cannot melt completely and so there can never be a meltdown. These safety features are very important because of the very large energy quantities for high energy batteries and therefore are frequently stipulated.

The separators of the invention are obtainable preferably by a process for producing a separator having lithium ion conducting properties, comprising a sheetlike flexible substrate provided with a multiplicity of openings and having a porous inorganic electrically insulating coating on and in said substrate, the material of said substrate being selected from non-woven electrically nonconductive polymeric fibers, which comprises producing the separator using a compound or a material which has lithium ion conducting properties.

In one variant embodiment of the process of the invention the separator with lithium ion conducting properties is obtained by treating a separator which to start with does not have lithium ion conducting properties with at least one lithium ion conducting material or with at least one material which following a further treatment has lithium ion conducting properties. In the case of this process the separators used which have no lithium ion conducting properties can be in particular those producible by the process described below, which was first described in DE 102 08 277.

The separator which can be used is obtainable preferably by a process for producing a separator that comprises providing a sheetlike flexible substrate provided with a multiplicity of openings with a coating in and on said substrate, the material of the substrate being selected from nonwoven electrically nonconductive polymeric fibers and the coating being a porous electrically insulating ceramic coating.

The coating is brought onto the substrate preferably by applying a suspension which comprises at least one electrically nonconducting or only very poorly electrically conducting oxide of the elements Al, Zr and/or Si and a sol to the substrate and solidifying it by heating at least once, in the course of which the suspension is solidified on and in the carrier. The process itself is known from WO 99/15262, but not all the parameters and ingredients, especially electrically nonconductive ingredients, can be used to produce the separator of the invention. Because of the selection of the ingredients there are also certain process parameters which had first to be found for the combinations of material suitable as separator.

The suspension can be brought onto and into the substrate for example by printing on, pressing on, pressing in, rolling on, knifecoating on, spreadcoating on, dipping, spraying or pouring on.

The material of the substrate is preferably selected from nonwovens of polymeric fibers having a thickness of from 5 to 30 µm. It can be particularly advantageous if the separator used in the process of the invention comprises a substrate having a thickness of from 10 to 20 µm.

The polymer fibers are preferably selected from polyacrylonitrile, polyester, for example polyethylene terephthalate, and/or polyolefins. However, all other known polymeric fibers can be used. The membrane of the invention preferably comprises polymeric fibers which have a softening temperature of more than 100° C. and a melting temperature of more than 110° C. It can be advantageous if the polymeric fibers have a diameter of from 0.1 to 10 µm, preferably from 1 to 5 µm.

The suspension used to produce the coating includes at least one inorganic oxide of aluminum, of silicon and/or of zirconium and at least one sol of the elements Zr, Al and/or Si and is prepared by suspending at least one inorganic component in at least one of said sols.

The sols are obtained by hydrolyzing at least one compound of the elements Al, Zr and/or Si. It can be advantageous to introduce the compound intended for hydrolysis into alcohol or an acid or a combination of these liquids prior to the hydrolysis. The compound to be hydrolyzed is preferably at least one nitrate, chloride or carbonate or, with particular preference, at least one alkoxide compound. The hydrolysis takes place preferably in the presence of water, steam, ice or an acid or a combination of these compounds.

In one variant embodiment of the process of the invention, hydrolysis of the compounds to be hydrolyzed is used to prepare particulate sols. These particulate sols are notable for the compounds formed by hydrolysis being present in the sol in particulate form. The particulate sols can be prepared as described above or as described in WO 99/15262. These sols customarily have a very high water content, which is preferably above 50% by weight. It can be advantageous for the compound intended for hydrolysis to be introduced into alcohol or an acid or a combination of these liquids prior to the hydrolysis. The hydrolyzed compound may be peptized by treatment with at least one organic or inorganic acid, preferably with a 10 to 60% strength organic or inorganic acid, more preferably with a mineral acid selected from sulfuric acid, hydrochloric acid, perchloric acid, phosphoric acid, and nitric acid or a mixture of these acids. The particulate sols thus prepared can then be used to prepare suspensions, in which case it is preferable to prepare suspensions for application to polymeric sol pretreated nonwovens of polymeric fiber.

In another variant embodiment of the process, hydrolysis of the compounds to be hydrolyzed is used to prepare polymeric sols. In this preferred embodiment of the process of the invention the sol has a water and/or acid fraction of less than 50% by weight. These polymeric sols are notable for the fact that the compounds formed by hydrolysis are present in the sol in polymeric form (i.e., in the form of chains crosslinked across a relatively large space). The polymeric sols customarily include less than 50% by weight and preferably very much less than 20% by weight of water and/or aqueous acid. To obtain the preferred fraction of water and/or aqueous acid the hydrolysis is preferably conducted in such a way that the compound to be hydrolyzed is hydrolyzed with from 0.5 to 10 times the molar ratio and preferably with half the molar ratio of water, water vapor or ice, based on the hydrolyzable group of the hydrolyzable compound. Up to 10 times the amount of water can be used in the case of compounds which hydrolyze very slowly, such as in the case of tetraethoxysilane, for example. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of water, water vapor or ice likewise leads to good results, although using more than 50% less than the preferred amount of one half the molar ratio is possible but not very sensible, since below this figure the hydrolysis is no longer complete and coatings based on such sols are not very stable.

To prepare sols having a desired, very low fraction of water and/or acid within them it can be advantageous if the compound to be hydrolyzed is dissolved in an organic solvent, especially ethanol, isopropanol, butanol, amyl alcohol, hexane, cyclohexane, ethyl acetate and/or mixtures of these compounds, before the actual hydrolysis is carried out. A sol thus prepared can be used for preparing the inventive suspension.

Both particulate sols and polymeric sols can be used in the process for preparing the suspension. Besides the sols obtainable as just described it is also possible in principle to use commercially available sols, such as zirconium nitrate sol or silica sol, for example. The process of producing separators by applying a suspension to a carrier and solidifyng it thereon is known per se from DE 101 42 622 and in similar form from WO 99/15262, though not all the parameters and ingredients are applicable to the production of the membrane of the invention. More particularly, the process described in WO 99/15262 is in that form not fully applicable to polymeric nonwoven materials, since the very watery sol systems described therein frequently do not permit complete, in-depth wetting of the customarily hydrophobic polymeric nonwovens, on account of the fact that most polymeric nonwovens are only poorly wetted by the very watery sol systems, if at all. It has been ascertained that even the minutest unwetted areas in the nonwoven material can lead to membranes or separators being obtained that have defects (such as holes or cracks) and hence are inutile.

It has now been found that, surprisingly, a sol system or suspension whose wetting behavior has been adapted to the polymers will completely penetrate the nonwoven materials and so provide defect-free coatings. In the process for producing the separator for use in the process of the invention, therefore, it is preferred to adapt the wetting behavior of the sol or suspension. This is preferably accomplished by preparing polymeric sols or suspensions of polymeric sols which comprise one or more alcohols, such as methanol, ethanol or propanol, for example, or mixtures which comprise one or more alcohols and also hydrocarbons, preferably aliphatic hydrocarbons. But other solvent mixtures are conceivable as well for addition to the sol or suspension in order that the wetting behavior thereof may be adapted to the substrate used.

It can be advantageous if in preparing the suspension an inorganic component comprising at least one oxide selected from the oxides of the elements Zr, Al and/or Si is suspended in a sol. It is preferred to suspend an inorganic component comprising at least one compound selected from alumina, zirconium oxide and/or silica. The mass fraction of the suspended component is preferably from 1 to 50 times and very preferably from 5 to 25 times that of the sol employed.

To improve the adhesion of the inorganic components to polymeric fiber substrates it can be advantageous for the suspensions used to be admixed with adhesion promoters, such as organofunctional silanes. Useful adhesion promoters include in particular compounds selected from the octylsilanes, the vinylsilanes, the amine-functionalized silanes and/or the glycidyl-functionalized silanes, for example the Dynasilans from Degussa. Particularly preferred adhesion promoters for polyethylene (PE) and polypropylene (PP) are vinyl-, methyl-, and octylsilanes, although exclusive use of methylsilanes is not optimal, for polyamides and polyamines they are amine-functional silanes, for polyacrylates and polyesters they are glycidyl-functionalized silanes, and for polyacrylonitrile it is also possible to use glycidyl-functionalized silanes. Other adhesion promoters can be used as well but have to be adapted to the respective polymers. The adhesion promoters must in this case be selected so that the solidification temperature is below the melting or softening point of the polymeric substrate used and below its decomposition temperature. Inventive suspensions very preferably include very much less than 25% by weight, preferably less than 10% by weight, of compounds which are capable of acting as adhesion promoters. An optimal fraction of adhesion promoter results from coating the fibers and/or particles with a monomolecular layer of the adhesion promoter. The amount in grams of adhesion promoter required for this purpose can be obtained by multiplying the amount (in g) of the oxides or fibers used by the specific surface area of the materials (in $m^2$ $g^{-1}$) and then dividing by the specific area required by the adhesion promoter (in $m^2$ $g^{-1}$), the specific area required frequently being in the order of from 300 to 400 $m^2$ $g^{-1}$.

Table 1 below contains an exemplory overview of useful adhesion promoters based on organofunctional Si compounds for typical polymers used as nonwoven material.

TABLE 1

| Polymer | Organofunctional type | Adhesion promoter |
|---|---|---|
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |
| PE, PP | Amino | AMEO, AMMO |
|  | Vinyl | VTMO, VTEO, Silfin |
|  | Methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane In a particular embodiment of the process of the invention the abovementioned adhesion promoters are applied to polymeric nonwoven (substrates) in a preceding step. To this end the adhesion promoters are dissolved in a suitable solvent, such as ethanol. This solution may additionally include a small amount of water, preferably from 0.5 to 10 times the molar amount of the hydrolyzable group, and small amounts of an acid, such as HCl or $HNO_3$, as a catalyst for the hydrolysis and condensation of the Si—OR groups. This solution is applied to the substrate by the familiar techniques, such as spraying on, printing on, pressing on, pressing in, rolling on, knifecoating on, spreadcoating on, dipping, spraying or pouring on, and the adhesion promoter is fixed on the substrate by a temperature treatment at from 50 to not more than 350° C. It is only after the adhesion promoter has been applied in this embodiment of the process of the invention that the suspension is applied and solidified.

Application of an adhesion promoter prior to the actual application of the suspension provides improved adhesivity of the substrates particularly with regard to aqueous particulate sols, which is why especially substrates pretreated in this way can be coated in accordance with the invention with suspensions based on commercially available sols, such as zirconium nitrate sol or silica sol. But this way of applying an adhesion promoter also means that the production process of the membrane of the invention has to be extended to include an intervening or preliminary treatment step. This is feasible, albeit more costly and inconvenient than the use of adapted sols to which adhesion promoters have been added, but also has the advantage that better results are obtained even using suspensions based on commercially available sols.

The coatings are applied to the substrate by solidifying the suspension in and on the substrate. According to the invention, the suspension present on and in the substrate can be solidified by heating at from 50 to 350° C. Since the maximum temperature is dictated by the substrate when polymeric substrate materials are used, it must be adapted accordingly. Thus, depending on the particular embodiment of the process of the invention, the suspension present on and in the substrate is solidified by heating at from 100 to 350° C. and most preferably by heating at from 200 to 280° C. It can be advantageous for the heating to take place at from 100 to 350° C. temperature for from 1 second to 60 minutes. With particular preference the heating of the suspension for solidification takes place at a temperature of from 110 to 300° C. and, most preferably, at a temperature of from 200 to 280° C. and preferably for from 0.5 to 10 min.

The assembly may be heated by means of heated air, hot air, infrared radiation or by other heating methods in accordance with the state of the art.

The process for producing the separator which is to be used can be carried out for example by unrolling the substrate from a roll, passing it at a speed of from 1 m/h to 2 m/s, preferably at a speed of from 0.5 m/min. to 20 m/min, and most preferably at a speed of from 1 m/min to 5 m/min through at least one apparatus which applies the suspension atop and into the support, for example a roller, and at least one further apparatus whereby the suspension can be solidified on and in the support by heating, for example an electrically heated furnace, and rolling up the separator thus produced on a second roll. In this way it is possible to produce the separator, intended for use, in a continuous process. Similarly, the pretreatment steps can be carried out in continuous fashion with the stated parameters observed.

To convert the separator which is not yet lithium ion conducting into a lithium ion conducting separator the material used to produce the lithium ion conducting separator of the invention comprises a material which carries negative fixed charges and lithium cations as counterion, the material carrying negative fixed charges preferably being selected from compounds which attach to the surface of the inorganic-coating via a phosphonyl or siloxane group.

With particular preference this lithium ion conducting material contains ionic groups from the group of the sulfonates, phosphonates, carbonates, sulfonylamides or mixtures thereof. These ionic groups may be organic compounds bonded chemically to the inorganic particles via organic groups or spacers. With particular preference these organic groups or spacers are fluorinated or nonfluorinated aryl and/or alkyl chains and/or polyether chains, and the ionic groups are attached by way of these chains to the inner and/or outer surface of the particles present in the separator. The ionic groups are attached to the inorganic particles either directly or else indirectly via the organic groups or spacers, via Si—O— or Zr—O— groups.

In one embodiment organosilicon compounds are used with the general formula

[(R¹O)₃Si—R²]M⁺, where $R^1$ is a methyl or ethyl group, M is either H or Li, and $R^2$ is a bis(perfluoromethylsulfonyl)amide group of the formula

—CF₂—SO₂—N—SO₂—CF₃.

In a preferred embodiment organosilicon compounds are used of the general formula

[{(RO)$_y$(R²)$_z$}$_a$Si—{R¹—SO₃⁻}$_b$]M⁺      (I)

or

[(RO)$_y$(R²)$_z$Si—R¹—PR³O₂⁻]M⁺      (II)

where $R^1$ is a linear or branched alkylene group having 1 to 12 carbon atoms, a cycloalkyl group having 5 to 8 carbon atoms or a unit of the general formula

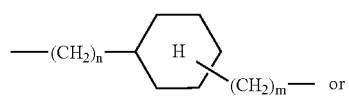
(IV)

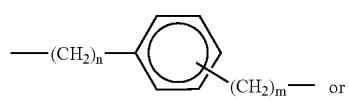
(V)

—(CF₂—(CF₂)$_l$—O)$_n$—(CF₂)$_m$—      (VI)

where l, n, and m are each a number from 0 to 12, in which M is an H⁺ or a lithium ion, and in which y is a number between 1 and 3, z is a number between 0 and 2, y+z=3, a is a number between 1 and 3, b=4−a, R and $R^2$ are identical or different and are methyl, ethyl, propyl, butyl or H, and $R^3$ is H, OH, OM or $R^1$.

In another embodiment the lithium ion conducting materials used can also be lithium phosphate zirconate glasses, α- and/or γ-lithium zirconium phosphates, or lithium sulfonates or lithium phosphonates which are attached to α- and/or γ-zirconium phosphonates, or a mixture of these compounds, in the separator of the invention. These compounds too may be derived from the corresponding acids by replacing the H⁺ with Li⁺. Indicated below are a number of examples:

Li₂Zr(O₃P—R—SO₃)₂

Li₄Zr(O₃P—R—PO₃)₂ where R is a perfluorinated, partly fluorinated or nonfluorinated aryl or alkyl chain having 1-12 carbon atoms.

All these lithium salts whose anions are attached to the inorganic matrix can therefore be derived from the corresponding acids. Within the separators, they may also be present initially in the form of the acids. In that case, however, before use in the batteries, it is necessary to convert the H⁺ form into the Li⁺ form.

These ion conducting compounds are preferably in the form of solution or sol. The weight fraction of the compound in the solution or in the sol can be from 1 to 99%, preferably from 10 to 50%, by weight. Within the solution the ion conducting materials may be present in the H⁺ form or in the Li⁺ form.

The separator, which is initially not a conductor of lithium ions, is treated with such a solution or sol. This can be done, for example, by printing on, pressing on, pressing in, rolling on, knifecoating on, spreadcoating on, rolling on, dipping, spraying or pouring on. This operation may also be repeated one or more times, with drying preferably at a temperature of from 50 to 280° C. between the treatment steps. Where the ion conducting materials are in the H⁺ form a further treatment step is necessary in the course of which the H⁺ ion is replaced by an Li⁺ ion.

With this embodiment it is preferred to use a separator for treatment that has an average pore size of from 0.5 to 5 μm.

Depending on the materials used it can be necessary to treat the separator thermally after the treatment with at least one lithium ion conducting material or at least one material which following further treatment has lithium ion conducting properties. Such thermal treatment is preferably conducted at a temperature of from 50 to 280° C.

In the case of the separators which have been treated with ion conducting materials in the H⁺ form it is now necessary to convert the H⁺ form into the Li⁺ form. This is accomplished in accordance with the known state of the art for such operations. For instance, the H⁺ form can be converted into the Li⁺ form by treating it with LiOH or LiNO₃ and subsequently removing the water or fuming off the nitric acid. All other known methods of ion exchange, however, are also conceivable.

In another variant embodiment a lithium ion conducting separator is not obtained by converting a separator which is does not conduct lithium ions into a lithium ion conducting separator by treatment with a lithium ion conducting material. Instead, the material used for producing the inorganic porous coating is a material which has lithium ion conducting properties. Preferably the suspension or the sol for the coating of the substrate, particularly of the flexible polymeric carrier comprising the inorganic particles, is admixed with a component which is directly lithium ion conducting or else becomes lithium ion conducting after a further treatment.

The separators used with this embodiment of the process of the invention then already have lithium ion conducting materials in the structure of the separator, i.e., in the inorganic coating of the separator that is to be used. The lithium ion conducting material is employed preferably in the form of an inorganic component during the preparation of the suspensions with which the substrates are treated. The lithium ion conducting material can in this case constitute a complete or partial replacement for the metal oxide particles used as an inorganic component in preparing the suspension. The fraction of the lithium ion conducting materials as a proportion of the inorganic component used to prepare the suspension is preferably from 1 to 99% by weight, more preferably from 5 to 80% by weight, and very preferably from 10 to 50% by weight.

As lithium ion conducting materials it is possible to use the same substances as already mentioned above. With this embodiment mode of the process of the invention in particular the material used to produce the inorganic porous coating includes at least one material selected from lithium phosphate zirconate glasses, α- and/or γ-lithium zirconium phosphates, and zirconium phosphates doped with free or immobilized lithium sulfonates.

In a further variant embodiment of the process of the invention the separator having lithium ion conducting properties is obtained by treating a separator which already has lithium ion conducting properties with at least one lithium ion conducting material or with at least one material which following a further treatment has lithium ion conducting properties.

The separators used in this embodiment of the process of the invention already have lithium ion conducting materials in the structure of the separator, i.e., in the inorganic coating of the separator that is to be used. Such separators are obtainable, for example, as just described by using a material having lithium ion conducting properties to produce the inorganic porous coating. This separator, already having lithium ion conducting properties, is then treated again as already described above for separators having no conducting properties for lithium ions; in the course of such treatment, lithium ion conducting material is introduced into the pores of the separator and solidified therein.

Where the separator of the invention is to be provided with an additional automatic shutdown mechanism, this can be done, for example, following the solidification of the suspension applied to the substrate, by applying a layer of particles which melt at a desired temperature and close the pores of the separator, so-called shutdown particles, in order to produce a shutdown mechanism on the separator, and fixing this applied particle layer. The layer of shutdown particles can be produced, for example, by applying a suspension of wax particles, having an average size greater than the average pore size of the separator, in a sol, water, solvent or solvent mixture.

The suspension used to apply the particles contains preferably from 1 to 50% by weight, more preferably from 5 to 40% by weight, and very preferably from 10 to 30% by weight of shutdown particles, especially wax particles, in the suspension.

Since the inorganic coating of the separator is frequently very hydrophilic in nature it has proven advantageous if the coating of the separator has been prepared using a silane in a polymeric sol as adhesion promoter and so has been made hydrophobic. In order to achieve effective adhesion and uniform distribution of the shutdown particles in the shutdown layer even on hydrophilic porous inorganic separator layers, a number of variants are possible.

In one variant embodiment of the process of the invention it has been determined to be advantageous to hydrophobicize the porous inorganic layer of the separator before the shutdown particles are applied. The production of hydrophobic membranes which works according to the same principle is described in WO 99/62624 for example. Preferably, the porous inorganic coating is hydrophobicized by treatment with alkyl-, aryl- or fluroalkylsilanes marketed for example by Degussa under the trade name Dynasilan. It is possible in this context to employ for example the familiar hydrophobicization methods which are employed inter alia for textiles (*D. Knittel; E. Schollmeyer; Melliand Textilber.*(1998) 79(5), 362-363), with minimal changes to the recipes, for the porous coatings on the separator as well. To this end, the coating or separator is treated with a solution which includes at least one hydrophobic material. It can be advantageous for the solvent in the solution to be water, preferably adjusted to a pH of from 1 to 3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol is in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy(3,3,4,4,5,5,6,6,7,7,8,8-tridecafluorooctyl)silane; instead, a treatment with methyltriethoxysilane or i-butyltriethoxysilane is completely sufficient to obtain the desired effect. The solutions are stirred at room temperature to achieve uniform distribution of the hydrophobic materials in the solution and subsequently applied to the inorganic coating on the separator and dried. Drying can be speeded up by treatment at temperatures from 25 to 100° C.

In a further variant embodiment of the process of the invention the porous inorganic coating can also be treated with other adhesion promoters before the shutdown particles are applied. Treatment with one of the adhesion promoters mentioned hereinbelow can then likewise be effected as described above, i.e., by treating the porous inorganic layer with a polymeric sol which includes a silane adhesion promoter.

The layer of shutdown particles is preferably produced by applying to the inorganic coating on the separator a suspension of shutdown particles in a suspension medium selected from the group consisting of a sol, water or solvent, for example alcohol, ethers or ketones, or a solvent mixture and then drying. The particle size of the shutdown particles present in the suspension is in principle arbitrary. It is, however, advantageous for the suspension to include shutdown particles having an average particle size ($D_w$) of not less than and preferably greater than the average size of the pores in the porous inorganic layer ($d_s$), since this ensures that the pores of the inorganic layer are not clogged by shutdown particles during the production of the separator of the invention. The shutdown particles used preferably have an average particle size ($D_w$) which is greater than the average pore diameter ($d_s$) and less than 5 $d_s$, more preferably less than 2 $d_s$.

To employ shutdown particles smaller in size than the pores of the porous inorganic layer, the particles must be prevented from penetrating into the pores of the porous inorganic separator layer. Reasons for employing such particles include for example large price differences, but also their availability. One way of preventing the penetration of the shutdown particles into the pores of the porous inorganic layer is to control the viscosity of the suspension in such a way that, absent external shearing forces, no penetration of the suspension into the pores of the inorganic layer of the separator takes place. Such a high viscosity for the suspension is obtainable for example by adding auxiliaries which influence the flow behavior, such as silicas (Aerosil, Degussa). When auxiliaries are used, Aerosil 200 for example, a fraction from 0.1 to 10% by weight, preferably from 0.5 to 50% by weight of silica, based on the suspension, is frequently sufficient to achieve an adequately high viscosity for the suspension. The fraction of auxiliaries can in each case be determined by simple preliminary tests.

It can be advantageous for the suspension used containing shutdown particles to contain adhesion promoters. Such a suspension with adhesion promoter can be applied directly to an inorganic layer of the separator even when the layer has not been hydrophobicized beforehand. It will be appreciated that a suspension with adhesion promoter can also be applied to a hydrophobicized layer or to a separator layer which has been made using an adhesion promoter. Adhesion promoters usefull in the shutdown particle suspension are preferably silanes having amino, vinyl or methacryloyl side groups. Such adhesion promoters include for example AMEO (3-aminopropyltriethoxysilane), MEMO (3-methacryloyloxypropyltrimethoxysilane), Silfin (vinylsilane+initiator+catalyst), VTEO (vinyltriethoxysilane) or VTMO (vinyltrimethoxysilane). Such silanes are available for example from Degussa as an aqueous solution under the designation Dynasilan 2926, 2907 or 2781. An adhesion promoter fraction of not more than 10% by weight has been found sufficient to ensure adequate adhesion of the shutdown particles to the porous inorganic layer. Shutdown particle suspensions with adhesion promoter preferably contain from 0.1 to 10% by weight, more preferably from 1 to 7.5% by weight, and very preferably from 2.5 to 5% by weight of adhesion promoter, based on the suspension.

Useful shutdown particles include all particles having a defined melting point. The particle material is chosen according to the desired shutdown temperature. Since relatively low shutdown temperatures are required for most batteries, it is advantageous to use shutdown particles selected from particles of polymers, polymer blends, natural and/or artificial waxes. Particularly preferred shutdown particles used are particles of polypropylene wax or of polyethylene wax.

The shutdown particle suspension may be applied to the porous inorganic layer of the separator by printing on, pressing on, pressing in, rolling on, knifecoating on, spreadcoating on, dipping, spraying or pouring on. The shutdown layer is preferably obtained by drying the applied suspension at a temperature from room temperature to 100° C. and more preferably from 40 to 60° C.

It can be advantageous for the shutdown particles to be fixed, after they have been applied to the porous inorganic layer, by heating one or more times to a temperature above the glass transition temperature, so that the particles are fused on without undergoing a change in actual shape. This makes it possible to ensure that the shutdown particles adhere particularly firmly to the porous inorganic separator layer.

The applying of the shutdown particle suspension with subsequent drying and any heating to above the glass transition temperature can be carried out continuously or quasicontinuously. Where a flexible separator is used as starting material, it can again be unwound from a roll, passed through a coating, drying, and, if implemented, heating apparatus, and then rolled up again.

The separators of the invention and the separators produced in accordance with the invention can be used in lithium batteries, especially in high power lithium batteries. Inventive hybrid separators can be used as separators in batteries. Where the separator is used according to the invention in lithium batteries it is normally impregnated or saturated with an electrolyte and placed between the anode and the cathode. The electrolyte used can be for example a solution of $LiPF_6$, $LiBF_4$, $LiClO_4$, $LiAsF_6$, $LiCF_3SO_3$, $LiClO_4$, lithium bisoxalatoborate (Libob) and/or lithium bis(trifluoromethylsulfonyl)amide (BTA, $LiN(SO_2CF_3)_2$) in ethylene carbonate (EC), dimethyl carbonate (DC), propylene carbonate (PC), methyl propyl carbonate (PMC), butylene carbonate (BC), diethyl carbonate (DEC), γ-butyrolactone (γ-BL), $SOCl_2$ and/or $SO_2$. The electrolyte solutions normally contain from 0.1 to 5 mol/l and with particular preference from 0.5 to 2 mol/l of conductive salt.

By using separators of the invention in batches it is possible to obtain batteries of the invention, especially lithium batteries, which comprise the separator of the invention. Such lithium batteries may be primary of secondary batch batteries, preferably secondary batteries. Such batteries of the invention are with particular preference high power lithium batteries.

The lithium ion conducting separators of the invention, the process for producing them, and their use are described by but not limited to the examples below.

COMPARATIVE EXAMPLE 1

Production of an S450PET Separator (Non-lithium Ion Conducting Separator as Comparison Example)

To 160 g of ethanol are initially added 15 g of a 5% by weight aqueous HCl solution, 10 g of tetraethoxysilane, 2.5 g of methyltriethoxysilane and 7.5 g of Dynasilan GLYMO (all Dynasilans manufactured by Degussa AG). This sol, which was initially stirred for some hours, is then used to suspend 125 g each of Martoxid MZS-1 and Martoxid MZS-3 (both aluminas from Martinswerke). This slip is homogenized with a magnetic stirrer for at least a further 24 h, during which the stirred vessel has to be covered over in order that solvent may not escape.

The above slip is used to coat a PET nonwoven about 30 μm in thickness and about 20 g/m² in basis weight in a continuous rollercoating process (at a belt speed of about 8 m/h, and at T=200° C.). In this rollercoating process the slip is coated onto the nonwoven using a roller turning opposite to the belt direction (the direction of movement of the nonwoven). The nonwoven subsequently passes through an oven at the stated temperature. The end result is a separator having an average pore size of 450 nm, a thickness of about 50 μm, and a weight of about 50 g/m².

The sheet resistance (measured by impedance spectroscopy using nonblocking lithium electrodes) of the separator saturated with a one molar solution of $LiPF_6$ in EC/DMC is about 5 Ωcm².

COMPARATIVE EXAMPLE 2

Li Ion Battery with Prior Art Hybrid Ceramic Separator

An S450PET separator produced according to comparative example 1 is installed in an Li ion cell consisting of a positive mass of $LiCoO_2$, a negative mass consisting of graphite and an electrolyte of $LiPF_6$ in ethylene carbonate/dimethyl carbonate [$LiCoO_2$//S-450-PET, EC/DMC 1:1, 1M $LiPF_6$// graphite]. Battery running is stable for several hundred cycles. Owing to the fairly large internal resistance in the separator only about 90% of the capacity of the cell can be charged with constant current.

INVENTIVE EXAMPLE 1

Production of a Lithium Ion Conducting S450PET/Li Separator by Treatment of Non-lithium Ion Conducting Sparator First of all a solution of a lithium conducting material is prepared. This is done by introducing 10 g of trihydroxysilylpropylsulfonic acid (from Degussa) into 50 g of water. An amount of LiOH (in the form of an aqueous 20% by weight solution) equimolar to the sulfonic acid is added to the first solution so that the resulting salt solution has a pH of approximately 7.

This solution is used to coat the known, non-lithium ion conducting separator from comparative example 1. Coating is carried out by the method likewise known from comparative example 1, i.e., a continuous rollercoating process (belt speed about 8 m/h, T=150° C.). The separator subsequently passes through an oven at the stated temperature. The end product is a separator having only a slightly reduced average pore size of about 400 nm and an unchanged thickness of about 50 μm as compared with the comparison sample.

The sheet resistance (measured by impedance spectroscopy using nonblocking Li electrodes) of the separator saturated with a one-molar solution of $LiPF_6$ in EC/DMC is about 4 $\Omega cm^2$ and hence about 20% lower than that of the comparison sample.

INVENTIVE EXAMPLE 2

Production of a Lithium Ion Conducting Separator

To 130 g of water and 30 g of ethanol are initially added 15 g of a 5% by weight aqueous $HNO_3$ solution, 10 g of tetraethoxysilane, 2.5 g of methyltriethoxysilane and 7.5 g of Dynasilan Silfin (all silanes and Dynasilans manufactured by Degussa AG). This sol, which was initially stirred for some hours, is then used to suspend 125 g each of Martoxid MZS-1 and Martoxid MZS-3 (both aluminas from Martinswerke). This slip is homogenized with a magnetic stirrer for at least a further 24 h, during which the stirred vessel has to be covered over in order that solvent may not escape.

In parallel a solution of a lithium conducting substance is prepared. This is done by introducing 10 g of trihydroxysilylpropylphosphonic acid into 50 g of water. An amount of LiOH (in the form of an aqueous 20% by weight solution) equimolar to the phosphonic acid is added to the first solution, so that the salt solution has a pH of approximately 7.

The ceramic slip and the lithium salt solution are mixed. Directly after this mixing operation, the above slip is used to coat a PET nonwoven about 15 μm in thickness and about 6 g/m² in basis weight in a continuous rollercoating process (at a belt speed of about 8 m/h, and at T=180° C.). In this rollercoating process the slip is coated onto the nonwoven using a roller turning opposite to the belt direction (the direction of movement of the nonwoven). The nonwoven subsequently passes through an oven at the stated temperature. The end result is a lithium ion conducting separator having an average pore size of 450 nm, a thickness of 30 μm, and a weight of about 25 g/m².

The sheet resistance (measured by impedance spectroscopy using nonblocking lithium electrodes) of the separator saturated with a one molar solution of $LiPF_6$ in EC/DMC is about 1 $\Omega cm^2$.

INVENTIVE EXAMPLE 3

Production of a Lithium Ion Conducting Separator

To 140 g of water and 15 g of ethanol are initially added 30 g of a 5% by weight aqueous $HNO_3$ solution, 10 g of tetraethoxysilane, 2.5 g of methyltriethoxysilane and 7.5 g of Dynasilan GLYMO (all Dynasilans manufactured by Degussa AG). This sol, which was initially stirred for some hours, is then used to suspend 80 g each of Martoxid MZS-1 and Martoxid MZS-3 (both aluminas from Martinswerke) and also 100 g of α-zirconium phosphate (from Southern Ionics, powder was subjected to further grinding and then has an average particle size of approximately 2 μm). This slip is homogenized with a magnetic stirrer for at least a further 24 h, during which the stirred vessel has to be covered over in order that solvent may not escape.

The above slip is used to coat a PET nonwoven about 15 μm in thickness and about 6 g/m² in basis weight in a continuous rollercoating process (at a belt speed of about 8 m/h, and at T=210° C.). In this rollercoating process the slip is coated onto the nonwoven using a roller turning opposite to the belt direction (the direction of movement of the nonwoven). The nonwoven subsequently passes through an oven at the stated temperature. The end result is a proton conducting separator having an average pore size of 450 nm, a thickness of almost 30 μm, and a weight of about 25 g/m².

In the next step it is necessary to convert the separator from the $H^+$ form into the $Li^+$ form. To this end the separator is immersed for a few minutes in a bath of 0.5M LiOH solution and the separator is dried again at 150° C. The separator is now lithium ion conducting.

The sheet resistance (measured by impedance spectroscopy using nonblocking lithium electrodes) of the separator saturated with a one molar solution of $LiPF_6$ in EC/DMC is about 1.5 $\Omega cm^2$.

INVENTIVE EXAMPLE 4

Production of a Lithium Ion Conducting S450PET/Li Separator by Treatment of a Non-lithium Ion Conducting Separator To 140 g of water and 15 g of ethanol are initially added 30 g of a 5% by weight aqueous $HNO_3$ solution, 10 g of tetraethoxysilane, 2.5 g of methyltriethoxysilane and 7.5 g of Dynasilan GLYMO (all Dynasilans manufactured by Degussa AG). This sol, which was initially stirred for some hours, is then used to suspend 125 g each of Martoxid MZS-1 and Martoxid MZS-3 (both aluminas from Martinswerke). This slip is homogenized with a magnetic stirrer for at least a further 24 h, during which the stirred vessel has to be covered over in order that solvent may not escape.

The above slip is used to coat a PET nonwoven about 15 μm in thickness and about 6 g/m² in basis weight in a continuous rollercoating process (at a belt speed of about 8 m/h, and at T=210° C.). In this roller coating process the slip is coated onto the nonwoven using a roller turning opposite to the belt direction (the direction of movement of the nonwoven). The nonwoven subsequently passes through an oven at the stated temperature. The end result is a non-lithium ion conducting separator having an average pore size of 450 nm, a thickness of almost 30 μm, and a weight of about 25 g/².

In parallel a solution of 10 g of trihydroxysilylpropylsulfonic acid (Degussa) in 50 g of water is prepared. The separator, which has a thickness of 30 μm but as yet is not lithium ion conducting, is likewise coated with this solution of the sulfonic acid in a continuous rollercoating process (belt speed about 8 m/h, T=150° C.). The separator then passes through an oven at the stated temperature.

In the next step it is necessary to convert the separator from the H⁺ form into the Li⁺ form. To this end the separator is immersed for a few minutes in a bath of 0.5M LiOH solution and the separator is dried again at 150° C. The separator is now lithium ion conducting.

The sheet resistance (measured by impedance spectroscopy using nonblocking lithium electrodes) of the separator saturated with a one molar solution of $LiPF_6$ in EC/DMC is about 2.5 Ωcm². That of the lithium ion conducting separator under the same conditions is about 1.5 Ωcm².

INVENTIVE EXAMPLE 5

Production of a Lithium Ion Conducting S450PET Separator by Treatment of a Non-lithium Ion Conducting Separator To 140 g of water and 15 g of ethanol are initially added 30 g of a 5% by weight aqueous $HNO_3$ solution, 10 g of tetraethoxysilane, 2.5 g of methyltriethoxysilane and 7.5 g of Dynasilan GLYMO (all Dynasilans manufactured by Degussa AG). This sol, which was initially stirred for some hours, is then used to suspend 125 g each of Martoxid MZS-1 and Martoxid MZS-3 (both aluminas from Martinswerke). This slip is homogenized with a magnetic stirrer for at least a further 24 h, during which the stirred vessel has to be covered over in order that solvent may not escape.

The above slip is used to coat a PET nonwoven about 15 μm in thickness and about 6 g/m² in basis weight in a continuous rollercoating process (at a belt speed of about 8 m/h, and at T=210° C.). In this rollercoating process the slip is coated onto the nonwoven using a roller turning opposite to the belt direction (the direction of movement of the nonwoven). The nonwoven subsequently passes through an oven at the stated temperature. The end result is a non-lithium ion conducting separator having an average pore size of 450 nm, a thickness of almost 30 μm, and a weight of about 25 g/m².

In parallel a solution of a lithium conducting substance is prepared. For this purpose, 10 g of trihydroxysilylperfluorooctylsulfonic acid are introduced in 50 g of water. An amount of LiOH (in the form of an aqueous 20% by weight solution) equimolar to the sulfonic acid is added to the first solution, so that the salt solution has a pH of about 7.

Using this solution, the above, non-lithium ion conducting separator is coated again in a continuous rollercoating process (belt speed approximately 8 m/h, T=150° C.). The separator then passes for drying through an oven at the stated temperature.

The sheet resistance (measured by impedance spectroscopy using nonblocking lithium electrodes) of the separator saturated with a one molar solution of $LiPF_6$ in EC/DMC is about 1.5 Ωcm².

INVENTIVE EXAMPLE 6

Li Ion Battery with Lithium Ion Conducting Separator 50 μm Thick

An S450PET/Li separator produced according to inventive example 1 is installed in a Li ion cell consisting of a positive mass of $LiCoO_2$, a negative mass consisting of graphite and an electrolyte of $LiPF_6$ in ethylene carbonate/dimethyl carbonate [$LiCoO_2$//S-450-PET, EC/DMC 1:1, 1M $LiPF_6$// graphite]. Battery running is stable for several hundred cycles. Owing to the distinctly lower internal resistance in the separator as compared with comparative example 2, it is now possible for well over 90% of the capacity of the cell to be charged with constant current.

INVENTIVE EXAMPLE 7

Li Ion Battery with Lithium Ion Conducting Separator 30 μm Thick

An S450PET/Li separator produced according to inventive example 5 is installed in a Li ion cell consisting of a positive mass of $LiCoO_2$, a negative mass consisting of graphite and an electrolyte of $LiPF_6$ in ethylene carbonate/dimethyl carbonate [$LiCoO_2$//S-450-PET, EC/DMC 1:1, 1M $LiPF_6$// graphite]. Battery running is stable for several hundred cycles. Owing to the distinctly lower internal resistance in the separator as compared with comparative example 2 and inventive example 6, it is now possible for virtually the entire capacity of the cell to be charged with constant current.

What is claimed is:

1. A separator for high power lithium batteries comprising a sheetlike flexible substrate having a multiplicity of openings and having a porous inorganic electrically insulating coating on and in said substrate, said coating closing the openings in the substrate, the material of said substrate being selected from non-woven electrically nonconductive polymeric fibers and said inorganic electrically insulating coating comprising particles, wherein the separator is an electrical insulator and has lithium ion conducting properties without the presence of an electrolyte and wherein the separator comprises at least one lithium ion conducting material and which lithium ion conducting material is chemically bonded to the inorganic coating, wherein the lithium ion conducting material is an organosilicon compound of formula $[(R^1O)_3Si\text{—}R^2]M^+$, wherein $R^1$ is methyl or ethyl, M is either H or Li, and $R^2$ is a bis(perfluoromethylsulfonyl)amide group of formula —$CF_2$—$SO_2$—N—$SO_2$—$CF_3$—; or an organosilicon compound of formula $[\{(RO)_y(R^4)_z\}_a Si\text{—}\{R^3\text{—}SO_3^-\}_b]M^+$ or $[\{(RO)_y(R^4)_z\}Si\text{—}R^3\text{—}PR^5O_2^-]M^+$, wherein $R^3$ is a linear or branched alkylene group having 1 to 12 carbon atoms, a cycloalkyl group having 5 to 8 carbon atoms or a unit of formula

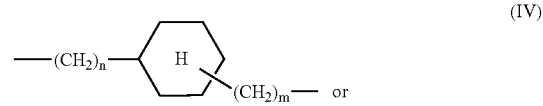

(IV)

(V)

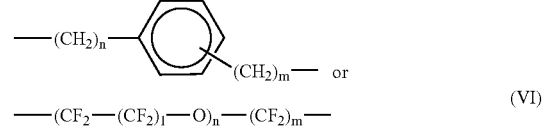

(VI)

wherein l, n, and m are respectively each a number from 0 to 12, M is an H⁺ or a lithium ion, y is a number between 1 and 3, z is a number between 0 and 2, y+z=3, a is a number between 1 and 3, b=4−a, R and $R^4$ are identical or different and are methyl, ethyl, propyl, butyl or H, and $R^5$ is H, OH, OM or $R^3$; or $Li_2Zr(O_3P\text{—}R\text{—}SO_3)_2$ or $Li_4Zr(O_3P\text{—}R\text{—}PO_3)_2$, wherein R is a perfluorinated, partly fluorinated or nonfluorinated aryl or alkyl chain having 1-12 carbon atoms.

2. The separator claim 1, wherein the particles of the inorganic electrically insulating coating comprise particles of oxides of the elements Al, Zr and/or Si.

3. The separator of claim 1, wherein the at least one lithium ion conducting inorganic material is present as an admixture in the structure of the separator in addition to said coating.

4. The separator of claim 1, wherein said particles are coated with said at least one lithium ion conducting material.

5. The separator of claim 1, wherein the inner and/or outer surfaces of the particles present in the separator are coated with a layer of the lithium ion conducting material.

6. The separator of claim 5, wherein the layer has a thickness of from 10 to 100 nm.

7. A process for producing a separator having lithium ion conducting properties as claimed in claim 1, comprising making a sheetlike flexible substrate having a multiplicity of openings and having a porous inorganic electrically insulating coating on and in said substrate, the material of said substrate being selected from non-woven electrically nonconductive polymeric fibers, which comprises a sheetlike flexible substrate having a multiplicity of openings being provided with a coating on and in said substrate the material of said substrate being selected from non-woven electrically nonconductive polymeric fibres and said coating being a porous electroinsulating ceramic coating and using a compound having lithium ion conducting properties to produce the separator.

8. The process of claim 7, wherein the separator having lithium ion conducting properties is obtained by treating a separator which does not have lithium ion conducting properties with at least one ion conducting material or with at least one material which following a further treatment has ion conducting properties.

9. The process of claim 7, wherein the treatment of the separator with at least one lithium ion conducting material or at least one material which following a further treatment has lithium ion conducting properties takes place by impregnating, dipping, spreadcoating, rollercoating, knife coating, spraying or other coating techniques.

10. The process of claim 7, wherein the separator following treatment with at least one lithium ion conducting material or with at least one material which following a further treatment has lithium ion conducting properties is thermally treated.

11. The process of claim 10, wherein the thermal treatment is conducted at a temperature of from 50 to 280° C.

12. The process of claim 7, wherein the material used to produce the inorganic porous coating is a material which has lithium ion conducting properties.

13. The process of claim 12, wherein the material used to produce the inorganic porous coating is a material selected from the group consisting of lithium phosphate zirconate glasses, α- and/or γ-lithium zirconium phosphates, zirconium phosphates doped with lithium sulfonates, zirconium phosphates doped with immobilized lithium sulfonates and mixtures thereof.

14. A lithium battery comprising a separator as claimed in claim 1.

15. A lithium battery as claimed in claim 14, wherein the separator is impregnated with an electrolyte.

16. A lithium battery as claimed in claim 15, wherein a solution of $LiPF_6$, $LiBF_4$, $LiClO_4$, $LiAsF_6$, $LiCF_3SO_3$, $LiClO_4$, lithium bisoxalatoborate (Libob) and/or lithium bis (trifluoromethylsulfonyl)amide (BTA, $LiN(SO_2CF_3)_2$) in ethylene carbonate (EC), dimethyl carbonate (DC), propylene carbonate (PC), methyl propyl carbonate (PMC), butylene carbonate (BC), diethyl carbonate (DEC), γ-butyrolactone(γ-BL), $SOCl_2$ and/or $SO_2$ is used as electrolyte.

17. A battery which comprises a separator as claimed in claim 1.

18. The separator of claim 1, wherein said at least one lithium ion conducting material comprises the compound of formula $[(R^1O)_3Si-R^2]M^+$.

19. The separator of claim 1, wherein said at least one lithium ion conducting material comprises the compound of formula $[\{(RO)_y(R^4)_z\}_a Si-\{R^3-SO_3^-\}_b]M^+$.

20. The separator of claim 1, wherein said at least one lithium ion conducting material comprises the compound of formula $[\{(RO)_y(R^4)_z\}Si-R^3-PR^5O_2^-]M^+$.

21. The separator of claim 1, wherein said at least one lithium ion conducting material comprises the compound of formula $Li_2Zr(O_3P-R-SO_3)_2$.

22. The separator of claim 1, wherein said at least one lithium ion conducting material comprises the compound of formula $Li_4Zr(O_3P-R-PO_3)_2$.

23. The separator of claim 1, wherein said at least one lithium ion conducting material comprises trihydroxysilylpropylsulfonic acid.

24. The separator of claim 1, wherein said at least one lithium ion conducting material comprises trihydroxysilylpropylphosphonic acid.

25. The separator of claim 1, wherein said at least one lithium ion conducting material comprises trihydroxysilylperfluorooctylsulfonic acid.

* * * * *